United States Patent
Wakuda (10) Patent No.: US 8,270,312 B2
(45) Date of Patent: Sep. 18, 2012

(54) COMMUNICATION SYSTEM, COMMUNICATION METHOD, COMMUNICATION DEVICE, AND PROGRAM

(75) Inventor: Kensaku Wakuda, Kanagawa (JP)

(73) Assignee: Sony Corporation (JP)

( * ) Notice: Subject to any disclaimer, the term of this patent is extended or adjusted under 35 U.S.C. 154(b) by 285 days.

(21) Appl. No.: 12/592,785

(22) Filed: Dec. 2, 2009

(65) Prior Publication Data
US 2010/0150010 A1    Jun. 17, 2010

(30) Foreign Application Priority Data
Dec. 17, 2008   (JP) ................................ P2008-321546

(51) Int. Cl.
*G01R 31/08*    (2006.01)

(52) U.S. Cl. ........................................ 370/252; 370/231

(58) Field of Classification Search .................. 370/230, 370/231, 235, 252, 230.1, 412
See application file for complete search history.

(56) References Cited

U.S. PATENT DOCUMENTS

| | | | |
|---|---|---|---|
| 4,720,829 A * | 1/1988 | Fukasawa et al. ............ | 714/701 |
| 5,212,808 A | 5/1993 | Su et al. | |
| 5,247,702 A | 9/1993 | Su et al. | |
| 5,258,995 A | 11/1993 | Su et al. | |
| 5,259,003 A | 11/1993 | Berger et al. | |
| 5,267,244 A | 11/1993 | Messerschmitt et al. | |
| 5,278,992 A | 1/1994 | Su et al. | |
| 5,398,258 A | 3/1995 | Su et al. | |
| 6,496,481 B1 * | 12/2002 | Wu et al. ........................ | 370/242 |
| 6,646,987 B1 * | 11/2003 | Qaddoura ...................... | 370/231 |
| 7,145,876 B2 * | 12/2006 | Huang et al. ................... | 370/232 |
| 7,400,587 B2 * | 7/2008 | Sinha ............................. | 370/241 |
| 7,668,099 B2 * | 2/2010 | Agnoli et al. .................. | 370/235 |
| 7,688,788 B2 * | 3/2010 | Gefflaut et al. ................ | 370/332 |
| 7,801,995 B2 * | 9/2010 | Lake et al. ..................... | 709/226 |
| 2008/0101237 A1 * | 5/2008 | Ogura et al. ................... | 370/235 |
| 2008/0151776 A1 | 6/2008 | Kure | |
| 2008/0198782 A1 | 8/2008 | Suzuki et al. | |

FOREIGN PATENT DOCUMENTS

| | | |
|---|---|---|
| JP | 7-509590 A | 10/1995 |
| JP | 2003209577 A | 7/2003 |
| JP | 2003283562 A | 10/2003 |
| JP | 2004056433 A | 2/2004 |
| JP | 2004-193990 A | 7/2004 |

(Continued)

OTHER PUBLICATIONS

Office Action from Japanese Application No. 2008-321546, dated Sep. 21, 2010.

*Primary Examiner* — Ricky Ngo
*Assistant Examiner* — Christine Ng
(74) *Attorney, Agent, or Firm* — Lerner, David, Littenberg, Krumholz & Mentlik, LLP (57) ABSTRACT

A communication system is provided which includes a first communication device for transmitting a plurality of packets in different packet sizes, and a second communication device having a reception unit for receiving over one or more links packets transmitted from the first communication device, and a calculation unit for calculating a packet loss rate for each packet size based on reception result of the reception unit. The communication system estimates a bit error rate during link transmission of the packets from a difference of the packet sizes of the packets transmitted from the first communication device as well as from the packet loss rate for each packet size calculated by the calculation unit.

8 Claims, 7 Drawing Sheets

FOREIGN PATENT DOCUMENTS

| | | |
|---|---|---|
| JP | 2004-193991 A | 7/2004 |
| JP | 2004-215199 A | 7/2004 |
| JP | 2005110294 A | 4/2005 |
| JP | 2006303887 A | 11/2006 |
| JP | 2008-160499 A | 7/2008 |
| WO | WO-93/09493 A1 | 5/1993 |

* cited by examiner

COMMUNICATION SYSTEM, COMMUNICATION METHOD, COMMUNICATION DEVICE, AND PROGRAM

CROSS-REFERENCE TO RELATED APPLICATION

The present application claims priority from Japanese Patent Application No. JP 2008-321546 filed in the Japanese Patent Office on Dec. 17, 2008, the entire content of which is incorporated herein by reference.

BACKGROUND OF THE INVENTION

1. Field of the Invention

The present invention relates to a communication system, a communication method, a communication device, and a program.

2. Description of the Related Art

When a plurality of communication devices transmit/receive a packet between each other over a network such as the Internet, a packet loss may occur in a wired link or wireless link along a communication route. A packet loss in the wired link occurs due to a buffer overflow at a relay device, and a packet loss in the wireless link occurs frequently due to an error or interference.

A communication device on the receiving side can notify a communication device on the transmitting side of information for specifying a lost packet, and can control packet transmission based on a packet loss rate along the communication route. The technology for realizing rate control based on the packet loss rate or Round Trip Time (RTT) is disclosed in JP-A-2004-215199, JP-A-2004-193991, and JP-A-2004-193990, for example.

SUMMARY OF THE INVENTION

However, although a communication device of a related art can specify the packet loss rate along the communication route, it is difficult for the communication device of a related art to specify under what circumstances the packet loss occurred. For example, it is difficult for the communication device of a related art to specify whether the packet loss occurred due to a buffer overflow at a relay device or due to a bit error during link transmission. Therefore, with the communication device of a related art, there is an issue that an appropriate transmission control in accordance with the cause of a packet loss is difficult to perform.

In light of the foregoing, it is desirable to provide a novel and improved communication system, communication method, communication device, and program that are capable of estimating information relating to the cause of a packet loss.

According to an embodiment of the present invention, there is provided a communication system including a first communication device for transmitting a plurality of packets in different packet sizes, and a second communication device having a reception unit for receiving over one or more links packets transmitted from the first communication device and a calculation unit for calculating a packet loss rate for each packet size based on reception result of the reception unit. A bit error rate during link transmission of the packets is estimated from a difference of the packet sizes of the packets transmitted from the first communication device as well as from the packet loss rate for each packet size calculated by the calculation unit.

When the reception unit receives, via a relay device whose buffer overflows depending on a number of packets, the packets transmitted from the first communication device, the first communication device or the second communication device may estimate, from the bit error rate during link transmission, a packet loss rate during link transmission for packets of a certain packet size, and may estimate a packet loss rate due to the buffer overflow of the relay device by subtracting the packet loss rate during link transmission from the packet loss rate calculated by the calculation unit for the packets of the certain packet size.

The higher the packet loss rate due to the buffer overflow of the relay device is estimated to be, the longer the first communication device may make a transmission interval between the packets.

The packets of different packet sizes to be transmitted from the first communication device may be configured by transmission data from the first communication device to the second communication device.

When the bit error rate during link transmission is above a predetermined value, a wireless link may be determined to be present in a communication route between the first communication device and the second communication device.

According to another embodiment of the present invention, there is provided a communication method including the steps of transmitting, by a first communication device, a plurality of packets in different packet sizes, receiving, over one or more links by a second communication device, packets transmitted from the first communication device, calculating a packet loss rate for each packet size based on reception result of the packets, and estimating a bit error rate during link transmission of the packets from a difference of the packet sizes of the packets transmitted from the first communication device as well as from the packet loss rate for each packet size.

According to another embodiment of the present invention, there is provided a communication device including a reception unit for receiving over one or more links a plurality of packets transmitted in different packet sizes, a calculation unit for calculating a packet loss rate for each packet size based on reception result of the reception unit, and an estimation unit for estimating a bit error rate during link transmission of the packets from a difference of the packet sizes of the packets received by the reception unit as well as from the packet loss rate for each packet size calculated by the calculation unit.

According to another embodiment of the present invention, there is provided a program for causing a computer to function as a reception unit for receiving over one or more links a plurality of packets transmitted in different packet sizes, a calculation unit for calculating a packet loss rate for each packet size based on reception result of the reception unit, and an estimation unit for estimating a bit error rate during link transmission of the packets from a difference of the packet sizes of the packets received by the reception unit as well as from the packet loss rate for each packet size calculated by the calculation unit.

According to the embodiments of the present invention described above, information relating to the cause of a packet loss can be estimated.

DETAILED DESCRIPTION OF EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Furthermore, the "DETAILED DESCRIPTION OF EMBODIMENT" will be described in the order shown below.

1. Overview of Image Communication System of Present Embodiment
2. Configuration of Image Transmission Device
3. Configuration of Image Reception Device
4. Operations of Image Transmission Device and Image Reception Device
5. Conclusion

1. OVERVIEW OF IMAGE COMMUNICATION SYSTEM OF PRESENT EMBODIMENT

First, referring to FIG. 1, an overall configuration of an image communication system 1 according to the present embodiment will be described.

Figure 1:
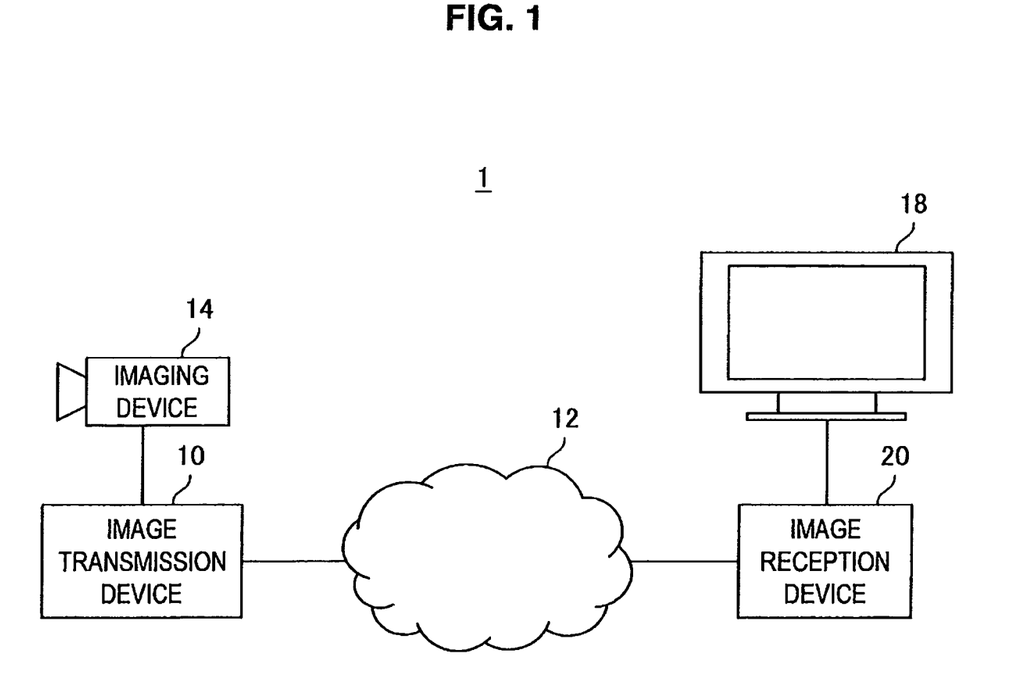
FIG. 1 is an explanatory diagram showing an overall configuration of an image communication system 1 according to an embodiment.

FIG. 1 is an explanatory diagram showing the overall configuration of the image communication system 1 according to the present embodiment. As shown in FIG. 1, the image communication system 1 includes an image transmission device 10, a network 12, an imaging device 14, a display device 18, and an image reception device 20.

The imaging device 14 takes an image of a subject, and obtains image data of a still image or a moving image. Then, the imaging device 14 supplies the image data to the image transmission device 10. In this specification, a case is assumed where audio data is added to the image data.

The image transmission device 10 is a communication device for encoding the image data supplied from the imaging device 14, generating a packet containing the encoded image data, and transmitting the packet to the image reception device 20 over the network 12. Furthermore, the image transmission device 10 operates according to TCP Friendly Rate Control (TFRC). Specifically, when receiving a feedback packet containing information such as a packet loss rate and Round Trip Time (RTT) from the image reception device 20, the image transmission device 10 performs a transmission control of a packet based on the feedback packet.

The network 12 includes a wired link or a wireless link for information to be transmitted from a device connected to the network 12. For example, the network 12 may include a public network such as the Internet, a telephone network, or a satellite network, various local area networks (LANs) including Ethernet (registered trademark), or a wide area network (WAN). Furthermore, the network 12 may include a leased line network such as an Internet protocol-virtual private network (IP-VPN).

The image reception device 20 is a communication device for receiving over the network 12 the packet transmitted from the image transmission device 10, reconstructing the image data based on the received packet, and decoding and supplying the image data to the display device 18. Furthermore, the image reception device 20 generates a feedback packet containing information relating to, for example, a packet loss rate, and transmits the feedback packet to the image transmission device 10 over the network 12.

The display device 18 displays the image data supplied from the image reception device 20. The display device 18 may be, for example, a cathode ray tube (CRT) display device, a liquid crystal display (LCD) device, or an organic light emitting diode (OLED) device.

According to such an image communication system 1, real-time communication of image data is enabled. Accordingly, for example, the image communication system 1 can be applied to a video phone system or a video conference system. Furthermore, although only a pair of communication devices (image transmission device 10 and image reception device 20) is shown in FIG. 1, a larger number of communication devices may be provided in the image communication system 1.

Furthermore, although an example has been described above where the image data is transmitted from the image transmission device 10 to the image reception device 20, bidirectional communication of the image data can also be realized by implementing a transmission function and a reception function on both the image transmission device 10 and the image reception device 20. Furthermore, although FIG. 1 shows an example where the communication device such as the image transmission device 10 or the image reception device 20 is configured separately from the imaging device 14 and the display device 18, the imaging device 14 and the display device 18 may be integrally configured with the communication device.

Furthermore, the function of the image transmission device 10 or the image reception device 20 described above may be applied to an Internet television system providing a television program in real-time. In this case, a server providing the television program functions as the image transmission device 10.

Furthermore, data to be transmitted from the image transmission device 10 is not limited to the image data. For example, the data to be transmitted from the image transmission device 10 may be audio data such as music, a lecture or a radio program, or any data such as a game or software.

Next, referring to FIG. 2, a concrete example of packet communication performed between the image transmission device 10 and the image reception device 20 will be described.

Figure 2:
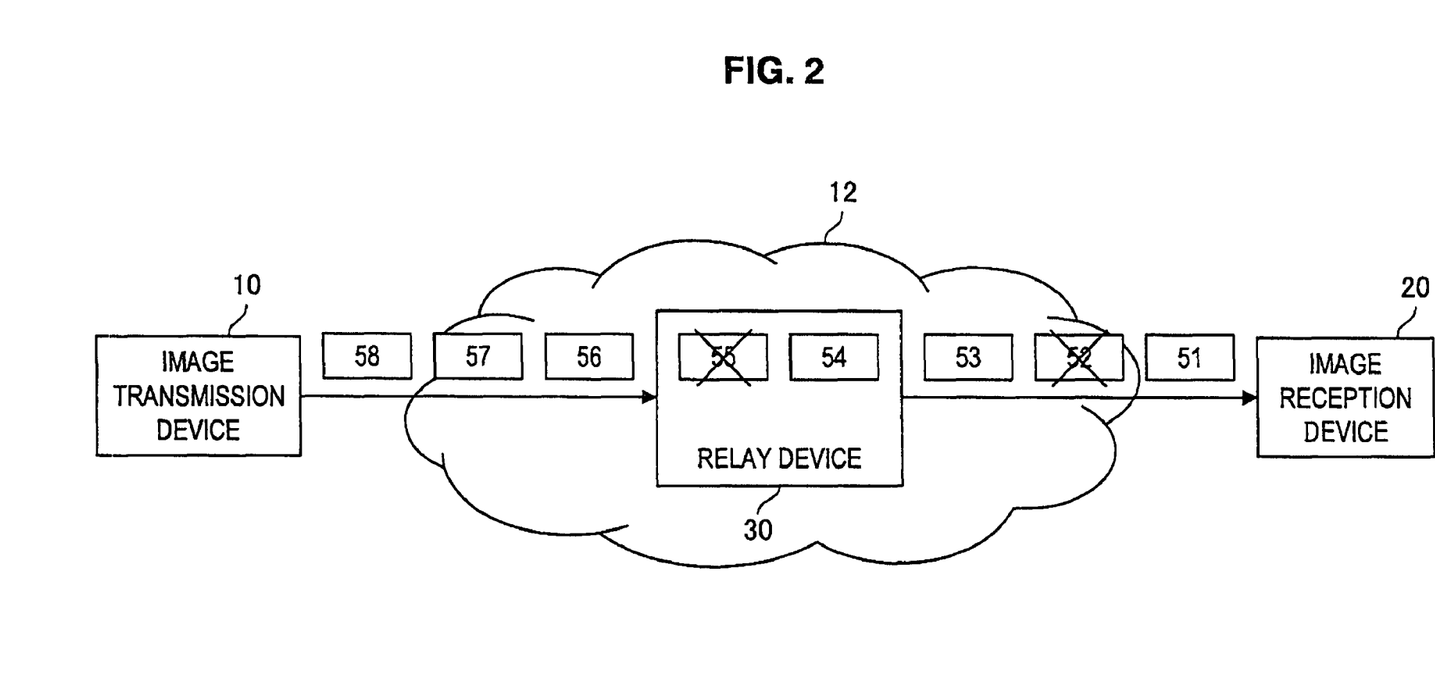
FIG. 2 is an explanatory diagram showing a concrete example of packet communication performed between an image transmission device and an image reception device.

FIG. 2 is an explanatory diagram showing the concrete example of packet communication performed between the image transmission device 10 and the image reception device 20. Each packet is appended with a sequence number. The number shown in a packet shown as a rectangle in FIG. 2 indicates the sequence number.

Furthermore, in the present embodiment, a communication path between two devices will be referred to as a link. Also, when the communication path between two devices is wireless, the communication path will be referred to as a wireless link; and when the communication path is wired, the communication path will be referred to as a wired link.

As shown in FIG. 2, a packet transmitted from the image transmission device 10 reaches the image reception device 20 via one or more relay devices 30. However, depending on the network environment, a packet loss may occur for packets transmitted from the image transmission device 10. The following two events may be cited as the main causes of the packet loss.

(1) Buffer Overflow of Relay Device 30

The relay device 30 relays a received packet after temporarily storing the packet in a buffer. Here, when a number of packets exceeding the number of packets that can be stored in the buffer are received, the buffer overflows and a part of the packets received is lost.

(2) Error and Collision During Link Transmission

During link transmission, particularly wireless link transmission, of a packet, a bit error may occur due to the influence of fading or the like, which may then result in a packet loss. Also, a packet loss often occurs due to a collision with a packet transmitted from another device.

In FIG. 2, an example is shown where a packet whose sequence number is "55" is lost due to the above-described (1), and a packet whose sequence number is "52" is lost due to the above-described (2).

Here, the image transmission device 10 can grasp the total packet loss rate (including the packet loss rate due to the buffer overflow of the relay device 30 and the packet loss rate due to the error and collision during the link transmission) based on the feedback packet from the image reception device 20. Furthermore, if the image transmission device 10 can grasp each of the packet loss rate due to the buffer overflow of the relay device 30 and the packet loss rate due to the error and collision during the link transmission, more efficient transmission control of packets will be enabled.

For example, as described above, the buffer of the relay device 30 overflows depending not on data amount, but on the number of packets, and thus, in case the packet loss rate due to the buffer overflow of the relay device 30 is high, the packet loss rate can be reduced by lengthening the transmission interval between packets. Also, in case the packet loss rate due to the error and collision during the link transmission is high, adoption of transmission control for avoiding the error during the link transmission is effective.

Figure 3:
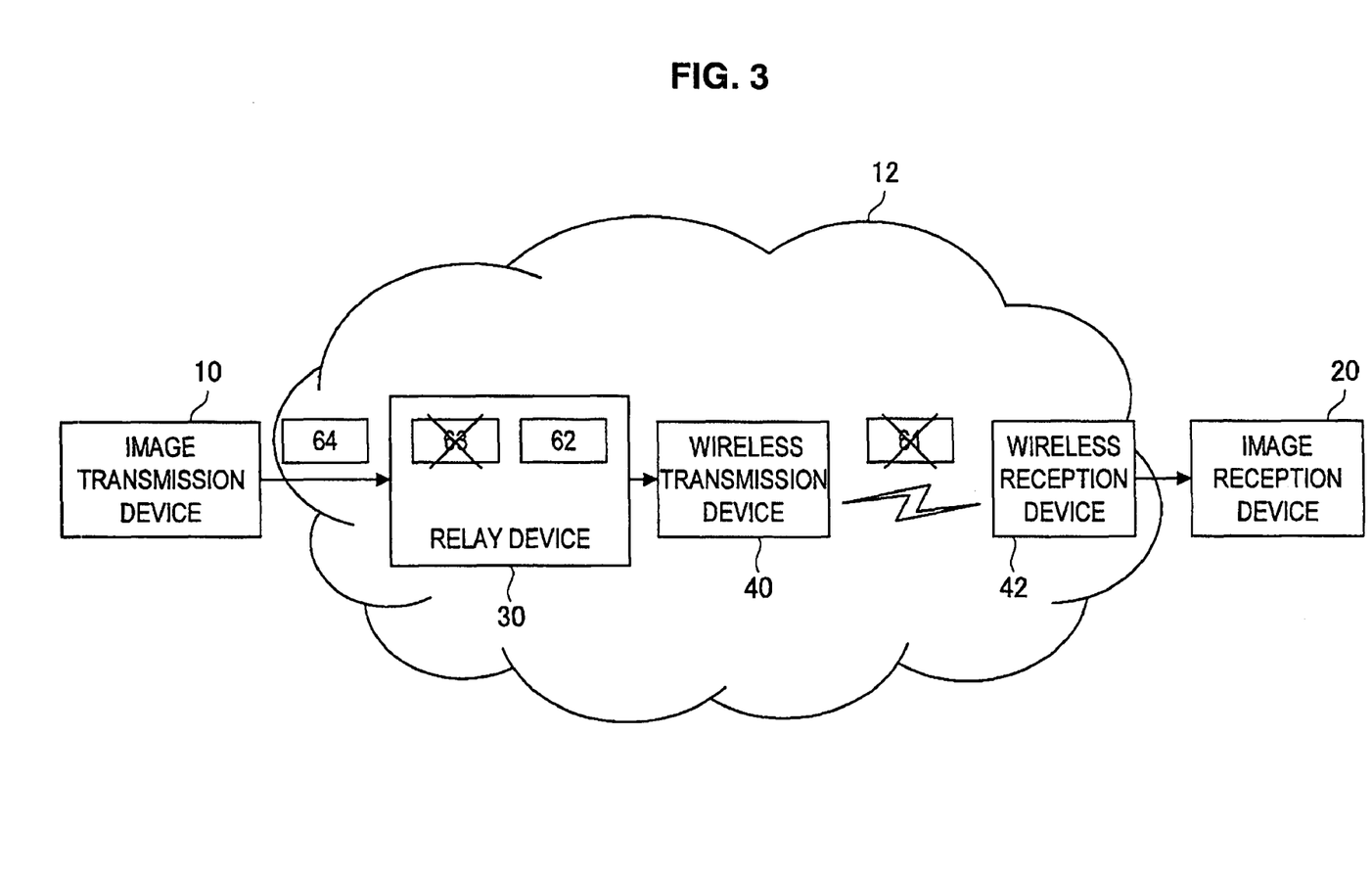
FIG. 3 is an explanatory diagram showing a concrete example of a communication route of packets transmitted from the image transmission device.

However, as shown in FIG. 3, when a wireless link is present in the network 12, it is difficult for the image transmission device 10 to grasp the packet loss rate due to the error and collision in the wireless link.

FIG. 3 is an explanatory diagram showing a concrete example of the communication route of packets transmitted from the image transmission device 10. In the example shown in FIG. 3, the packets transmitted from the image transmission device 10 are transmitted through a wired link between the image transmission device 10 and the relay device 30, a wired link between the relay device 30 and a wireless transmission device 40, and a wireless link between the wireless transmission device 40 and a wireless reception device 42. Also, FIG. 3 shows an example where a packet whose sequence number is "63" is lost due to the buffer overflow of the relay device 30, and a packet whose sequence number is "61" is lost during wireless link transmission.

In this case, the image reception device 20 can detect the loss of the packet whose sequence number is "61" and the packet whose sequence number is "63," and can calculate the total packet loss rate. However, with an image reception device relating to the present embodiment, it is difficult to estimate the contents of the total packet loss rate.

Thus, the image communication system 1 according to the present embodiment has been devised in light of the foregoing circumstances. According to the image communication system 1 according to the present embodiment, the packet loss rate due to the buffer overflow of the relay device 30 and the packet loss rate during link transmission can be separately estimated. In the following, the image transmission device 10 and the image reception device 20 configuring such an image communication system 1 will be described in detail.

2. CONFIGURATION OF IMAGE TRANSMISSION DEVICE

Figure 4:
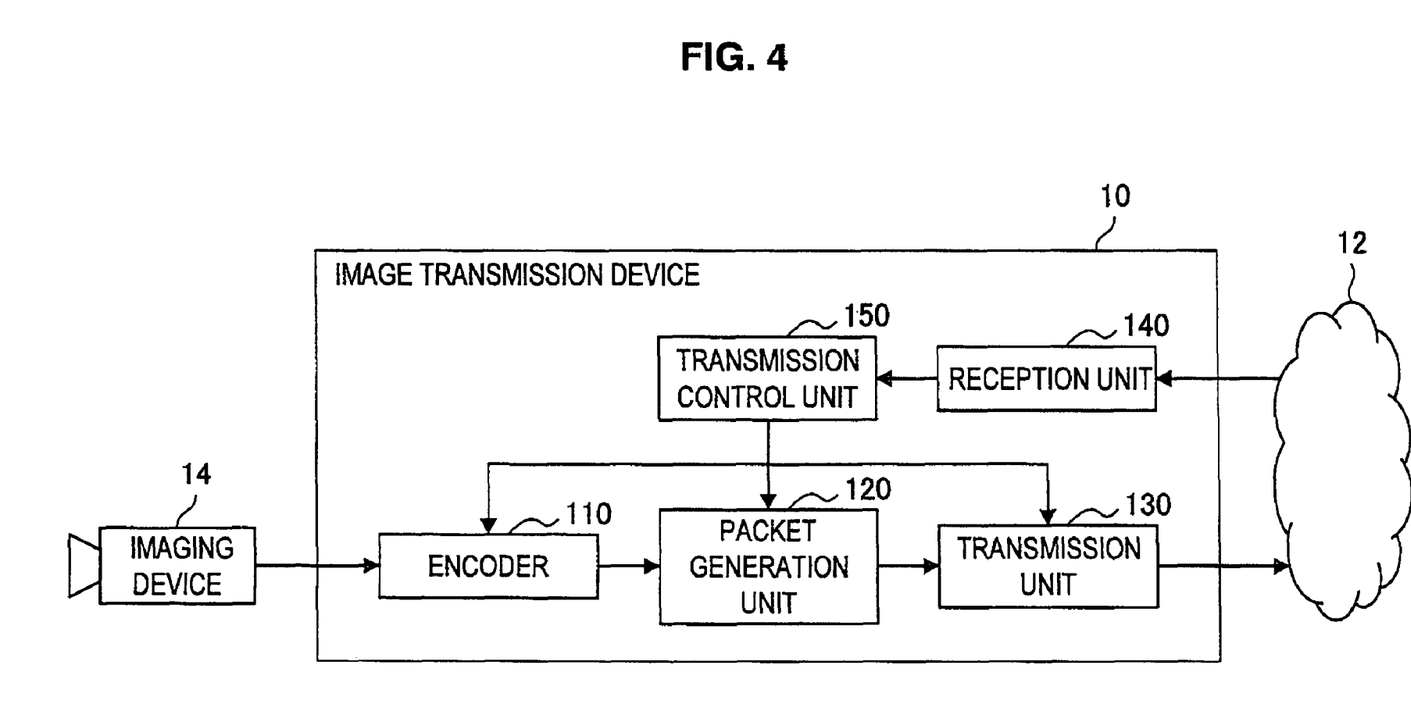
FIG. 4 is a functional block diagram showing a configuration of the image transmission device according to the present embodiment.

FIG. 4 is a functional block diagram showing a configuration of the image transmission device 10 according to the present embodiment. As shown in FIG. 4, the image transmission device 10 includes an encoder 110, a packet generation unit 120, a transmission unit 130, a reception unit 140, and a transmission control unit 150.

The encoder 110 encodes image data supplied from the imaging device 14, based on the control by the transmission control unit 150. The encoding scheme may be, for example, Joint Photographic coding Experts Group (JPEG), JPEG 2000, Motion JPEG, Advanced Video Coding (AVC), Moving Picture Experts Group (MPEG) 1, MPEG 2, or MPEG 4.

The packet generation unit 120 generates packets based on the image data encoded by the encoder 110, and supplies the packets to the transmission unit 130. Specifically, the packet generation unit 120 generates packets by dividing the image data encoded by the encoder 110 and adding a TCP (Transmission Control Protocol)/IP header to the divided image data. The packet generation unit 120 may also generate packets by adding a UDP (User Datagram Protocol)/IP header to the divided image data. A sequence number for identifying each packet is included in the header.

Furthermore, the packet generation unit 120 generates packets of different packet sizes. More specifically, the packet generation unit 120 alternately generates packets of packet size L' and packets of packet size L". Details will be described later, but simply put, such a configuration enables to estimate separately the packet loss rate due to the buffer overflow of the relay device 30 and the packet loss rate during link transmission.

It is desirable that there is a certain degree of difference between the packet size L' and the packet size L", and the packet size L'/packet size L" may be within the range of 0.3 to 0.7, for example. Also, the packet generation unit 120 may change the packet size L' and the packet size L" according to control by the transmission control unit 150.

Furthermore, in this specification, although an example will be mainly described where the packet generation unit 120 generates packets of two different sizes based on the image data, the present embodiment is not limited to such an example. For example, the packet generation unit 120 may generate several packets of the same packet size in a row, may generate packets of three different sizes, or may generate packets not containing image data.

The transmission unit 130 transmits the packets supplied from the packet generation unit 120 to the image reception device 20 at a timing controlled by the transmission control unit 150, according to RTP.

The reception unit 140 receives a feedback packet transmitted from the image reception device 20 over the network 12. The feedback packet contains information enabling to specify the contents of the total packet loss rate of packets transmitted from the transmission unit 130. Specifically, the feedback packet may contain the contents itself of the total packet loss rate, information indicating the bit error rate during the link transmission, or the packet loss rate for each packet size.

The transmission control unit 150 can improve the Quality of Service (QoS) by specifying the contents of the total packet loss rate based on the feedback packet received by the reception unit 140 and performing transmission control in accordance with the contents of the total packet loss rate.

For example, when large part (for example, more than half) of the total packet loss rate is the packet loss rate due to the buffer overflow of the relay device 30, the transmission control unit 150 may lengthen the transmission interval between packets from the transmission unit 130. With this configuration, pace of accumulation of packets in the buffer of the relay device 30 can be slowed, and thus occurrence of buffer overflow of the relay device 30 can be suppressed and the packet loss rate can be reduced.

Furthermore, the transmission control unit 150 may control the packet size of a packet to be generated by the packet generation unit 120, according to the packet loss rate during link transmission or the bit error rate during link transmission. For example, when the packet loss rate during link transmission or the bit error rate during link transmission is below a predetermined value, the transmission control unit 150 may increase the packet size of a packet to be generated by the packet generation unit 120. With this configuration, the transmission of the image data can be increased.

In a similar manner, when the packet loss rate during link transmission or the bit error rate during link transmission is above the predetermined value, the transmission control unit 150 may decrease the packet size of a packet to be generated by the packet generation unit 120. With this configuration, the packet loss rate during link transmission can be reduced.

3. CONFIGURATION OF IMAGE RECEPTION DEVICE

Next, referring to FIG. 5, a configuration of the image reception device 20 according to the present embodiment will be described.

Figure 5:
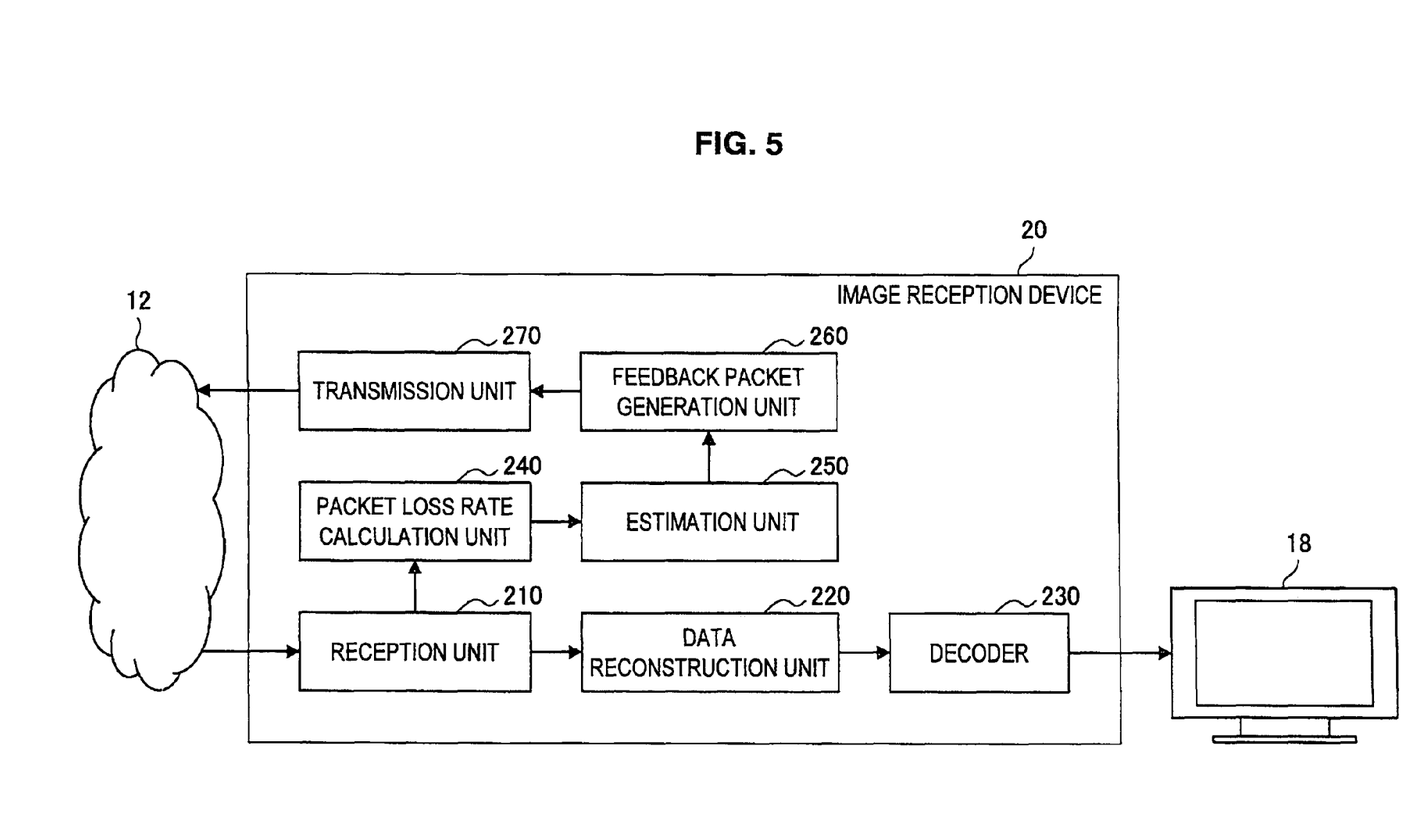
FIG. 5 is a functional block diagram showing the configuration of the image reception device according to the present embodiment.

FIG. 5 is a functional block diagram showing the configuration of the image reception device 20 according to the present embodiment. As shown in FIG. 5, the image reception device 20 includes a reception unit 210, a data reconstruction unit 220, a decoder 230, a packet loss rate calculation unit 240, an estimation unit 250, a feedback packet generation unit 260, and a transmission unit 270.

The reception unit 210 receives packets in packet size L' and packet size L" transmitted from the image transmission device 10. Then, the reception unit 210 supplies the received packets to the data reconstruction unit 220, and supplies the sequence numbers included in the headers to the packet loss rate calculation unit 240.

The data reconstruction unit 220 reconstructs the image data based on the packets supplied from the reception unit 210. That is, since divided image data is included in each packet, the data reconstruction unit 220 combines a plurality of pieces of divided image data included in a plurality of packets and reconstructs the image data.

The decoder 230 decodes the image data reconstructed by the data reconstruction unit 220, and supplies the decoded image data to the display device 18. As a result, the display device 18 is enabled to display in real-time the image data captured by the imaging device 14.

The packet loss rate calculation unit 240 functions as a detection unit for detecting the packet loss based on the sequence number supplied from the reception unit 210 and as a calculation unit for calculating the packet loss rate.

Specifically, the packet loss rate calculation unit 240 detects the packet loss based on whether the sequence number previously supplied from the reception unit 210 and the sequence number newly supplied from the reception unit 210 are consecutive or not. That is, the existence of a packet that the image transmission device 10 transmitted but the image reception device 20 did not receive is detected. Furthermore, the packet loss rate calculation unit 240 specifies the sequence number of the lost packet. For example, it is assumed that the sequence number previously supplied from the reception unit 210 is "56," and the sequence number newly supplied from the reception unit 210 is "58." In this case, since the sequence numbers are not consecutive, the packet loss rate calculation unit 240 detects that the packet whose sequence number is "57" which is between the sequence numbers "56" and "58" is lost.

Furthermore, the packet loss rate calculation unit 240 separately calculates the loss rate of packets of packet size L' and the loss rate of packets of packet size L". For example, it is assumed that even sequence numbers correspond to packet size L', and odd sequence numbers correspond to packet size L". In this case, the packet loss rate calculation unit 240 can calculate the loss rate of packets of packet size L' based on the amount of even numbers among the sequence numbers of the lost packets, and can calculate the loss rate of packets of packet size L" based on the amount of odd numbers among the sequence numbers of the lost packets.

The estimation unit 250 can estimate the bit error rate during the link transmission by using the loss rate of packets of packet size L' and the loss rate of packets of packet size L" calculated by the packet loss rate calculation unit 240. In the following, the function of the estimation unit 250 will be described in detail.

As described above, the main causes for the packet loss are assumed to be <1. Buffer Overflow of Relay Device 30> and <2. Error and Collision during Link Transmission>. Here, it is supposed that a packet loss rate Pc due to <1. Buffer Overflow of Relay Device 30> is not dependent on the packet size, and that a packet loss rate Pw due to <2. Error and Collision during Link Transmission> is higher as the packet size is larger as indicated in the following Equation 1.

$$P_w = 1 - (1 - BER)^L \quad \text{(Equation 1)}$$

In Equation 1, the unit of packet size L is bit, and BER indicates the bit error rate during the link transmission. That is, Equation 1 indicates the probability of occurring packet loss, in case bit error occurs even for one bit in a packet. Moreover, an error correction bit may be added to the packet, but since, even in such a case, the loss occurs more frequently as the packet size is larger, a case is assumed in this specification where the error correction bit is not added. Furthermore, the total packet loss rate $P_{loss}$ is expressed as the following Equation 2.

$$P_{loss} = P_c + P_w(1 - P_c) \quad \text{(Equation 2)}$$

When the loss rate of packets of packet size L' calculated by the packet loss rate calculation unit 240 is expressed as $P'_{loss}$ and the loss rate of packets of packet size L" is expressed as $P''_{loss}$, BER shown in Equation 1 can be expressed as the following Equation 3.

$$BER = 1 - \left(\frac{P''_{loss} - 1}{P'_{loss} - 1}\right)^{\frac{1}{L'' - L'}} \quad \text{(Equation 3)}$$

Furthermore, by substituting Equation 3 into BER shown in Equation 1, a loss rate P'w due to <2. Error and Collision during Link Transmission> of packets of packet size L' can be estimated using the following Equation 4.

$$P'w = 1 - \left(\frac{P''_{loss} - 1}{P'_{loss} - 1}\right)^{\frac{L'}{L'' - L'}} \quad \text{(Equation 4)}$$

Furthermore, by substituting the loss rate P'w due to <2. Error and Collision during Link Transmission> of packets of packet size L' into Equation 2, the loss rate Pc due to <1. Buffer Overflow of Relay Device 30> of packets of packet size L' can also be estimated. Moreover, the estimation unit 250 may perform the estimation described above over a cycle of a predetermined period or a cycle of sequence numbers.

The feedback packet generation unit 260 generates a feedback packet containing information estimated by the estimation unit 250 (loss rate Pc, loss rate P'w, BER, and the like) and/or information calculated by the packet loss rate calculation unit 240 (P'$_{loss}$, P''$_{loss}$).

The transmission unit 270 transmits the feedback packet generated by the feedback packet generation unit 260 to the image transmission device 10 at a predetermined timing. As a result, transmission control in accordance with the contents of the packet loss rate by the transmission control unit 150 can be realized.

4. OPERATIONS OF IMAGE TRANSMISSION DEVICE AND IMAGE RECEPTION DEVICE

Next, referring to FIGS. 6 and 7, operations of the image transmission device 10 and the image reception device 20 will be described.

Figure 6:
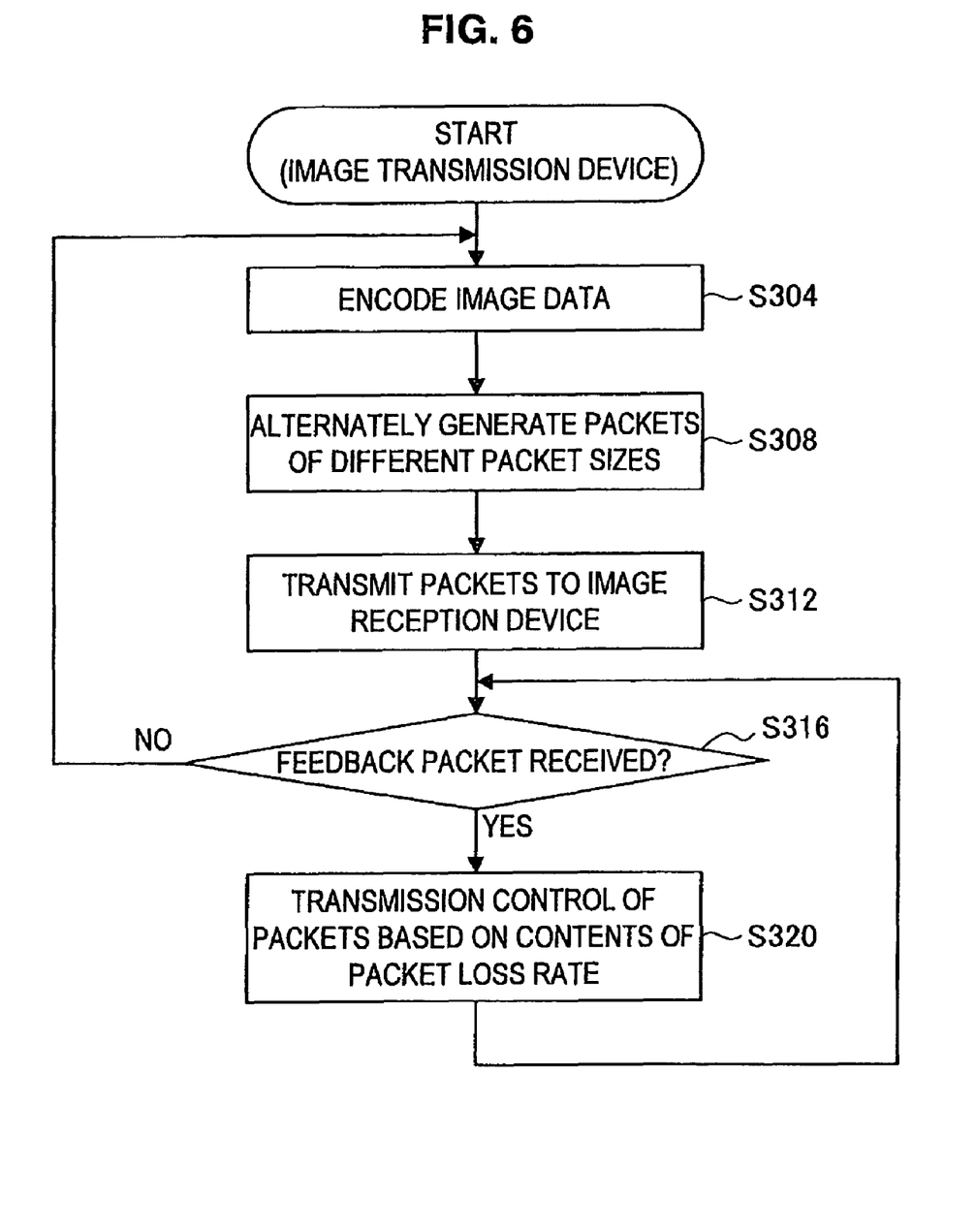
FIG. 6 is a flow chart showing an operational flow of the image transmission device according to the present embodiment.

FIG. 6 is a flow chart showing an operational flow of the image transmission device 10 according to the present embodiment. As shown in FIG. 6, first, the encoder 110 of the image transmission device 10 encodes image data supplied from the imaging device 14 (S304). Subsequently, the packet generation unit 120 alternately generates packets of different packet sizes based on the encoded image data (S308). Then, the transmission unit 130 transmits the packets generated by the packet generation unit 120 to the image reception device 20 over the network 12 (S312).

Then, when the reception unit 140 of the image transmission device 10 receives a feedback packet from the image reception device 20 (S316), the transmission control unit 150 performs transmission control of packets based on the information contained in the feedback packet (S320).

For example, when BER contained in the feedback packet is above a predetermined value, the transmission control unit 150 may determine that a wireless link is included in a communication route and may perform appropriate transmission control on the wireless link.

Figure 7:
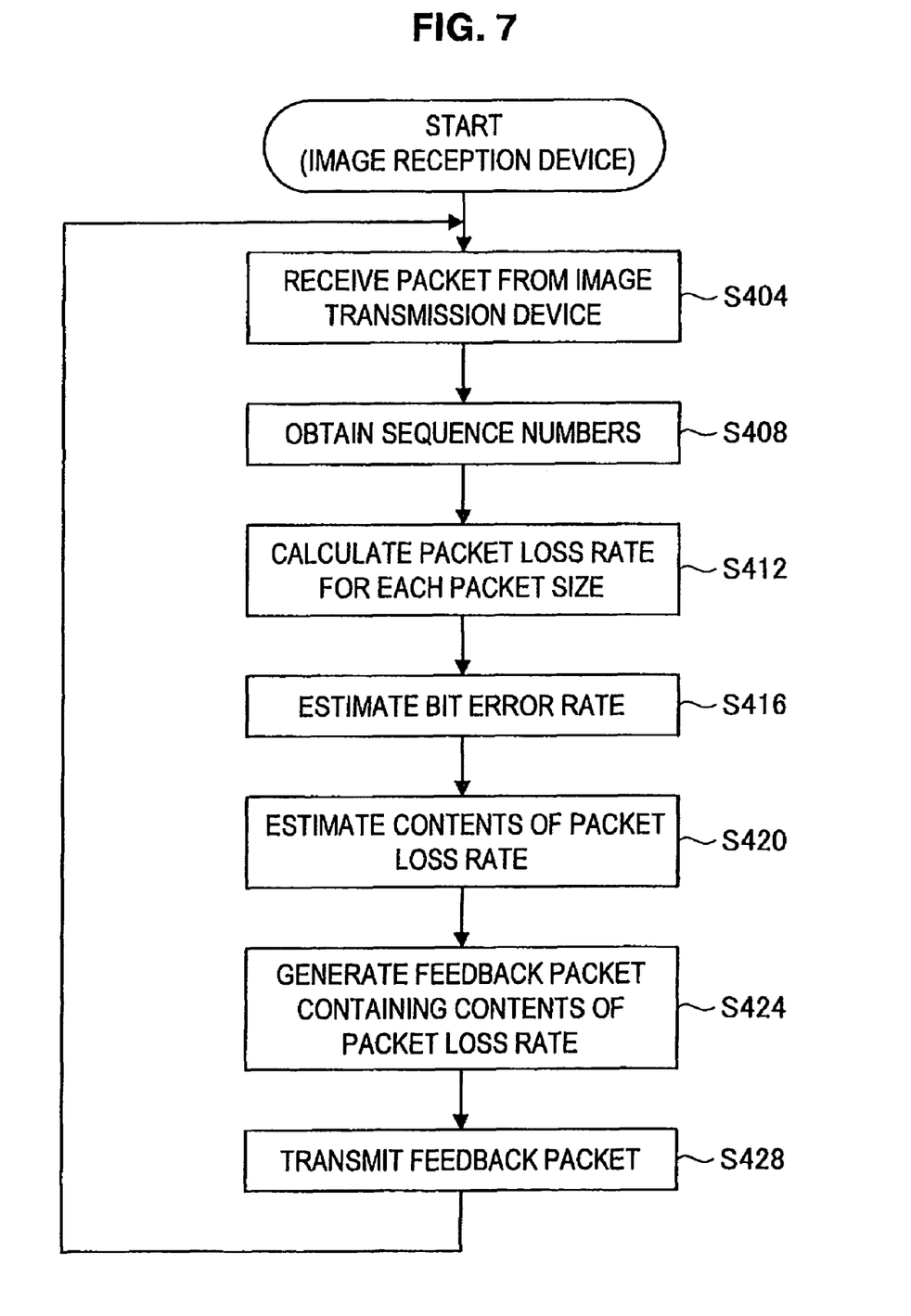
FIG. 7 is a flow chart showing an operational flow of the image reception device according to the present embodiment.

FIG. 7 is a flow chart showing an operational flow of the image reception device 20 according to the present embodiment. As shown in FIG. 7, first, when the reception unit 210 of the image reception device 20 receives packets from the image transmission device 10 (S404), the reception unit 210 obtains the sequence numbers from the headers of the packets and supplies the sequence numbers to the packet loss rate calculation unit 240 (S408).

Then, the packet loss rate calculation unit 240 calculates the packet loss rate for each packet size (S412). Then, the estimation unit 250 estimates the bit error rate during link transmission of the packets and the contents of the packet loss rate by using Equations 1 to 4, based on the packet loss rate for each packet size (S416, S420).

Subsequently, the feedback packet generation unit 260 generates a feedback packet containing the contents of the packet loss rate estimated by the estimation unit 250 (S424), and the transmission unit 270 transmits the feedback packet to the image transmission device 10 (S428). Moreover, the data reconstruction unit 220 and the decoder 230 of the image reception device 20 respectively reconstructs or decodes the image data in parallel with the processes described above, and the image data is supplied to the display device 18 where the image data is displayed by the display device 18.

5. CONCLUSION

As described above, in the present embodiment, since the image transmission device 10 transmits packets in different packet sizes, both the packet loss rate due to the buffer overflow of the relay device 30 and the packet loss rate during the link transmission can be separately estimated. Furthermore, the image transmission device 10 can improve the QoS for communication by performing transmission control of packets based on the packet loss rates.

Furthermore, since the image transmission device 10 transmits image data to be transmitted to the image reception device 20 in different packet sizes, it is effective in that a packet dedicated to estimating the packet loss rate does not have to be transmitted.

It should be understood by those skilled in the art that various modifications, combinations, sub-combinations and alterations may occur depending on design requirements and other factors insofar as they are within the scope of the appended claims or the equivalents thereof.

For example, an example has been described above where the image reception device 20 estimates the bit error rate during the link transmission of packets and the contents of the packet loss rate. However, the present invention is not limited to such an example. In a modified example, the image reception device 20 may transmit a feedback packet containing the loss rate of packets of packet size L' and the loss rate of packets of packet size L''. The image transmission device 10 is then allowed to estimate, from the loss rate of packets of packet size L' and the loss rate of packets of packet size L'', the bit error rate during the link transmission of packets and the contents of the packet loss rate according to Equations 1 to 4.

Furthermore, in the above, a case has been assumed where a wireless link and a wired link are mixed in the communication route of packets. However, the present invention is not limited to such an example. For example, the communication route of packets may be configured from a high reliability link such as an optical fibre and a low reliability link such as an ADSL. In this case, if bit error is supposed not to occur during the transmission in the high reliability link, the image reception device 20 can estimate the packet loss rate during the transmission in the low reliability link and the packet loss rate at the relay device 30 by applying Equations 1 to 4.

Furthermore, each of the steps performed by the image transmission device 10 and the image reception device 20 in this specification does not have to be performed chronologically in the order shown in the flow charts. For example, each of the steps performed by the image transmission device 10 and the image reception device 20 may include processing in parallel or as individual steps (for example, parallel processing or object processing).

Furthermore, a computer program may also be created that directs hardware such as a CPU, a ROM, a RAM and the like built into the image transmission device 10 and the image reception device 20 to fulfill functions of each of the configurations of the image transmission device 10 and the image reception device 20 described above. Furthermore, a storage medium storing the computer program is also provided. A series of processing can also be realized as hardware by configuring each of the functional blocks shown in the functional block diagrams of FIGS. 4 and 5 as hardware.

What is claimed is:

1. A communication system; comprising:
a first communication device for transmitting a plurality of packets in different packet sizes; and
a second communication device, including:
a reception unit for receiving over one or more links packets transmitted from the first communication device, and
a calculation unit for calculating a packet loss rate for each packet size based on reception result of the reception unit,
wherein a bit error rate during link transmission of the packets is estimated from a difference of the packet sizes of the packets transmitted from the first communication device, as well as from the packet loss rate for each packet size calculated by the calculation unit, according to the relation:

$$BER=1-(P''_{loss}-1/P'_{loss}-1)^{1/L''-L'},$$

where $P'_{loss}$ is the loss rate of packets of packet size L', and $P''_{loss}$ is the loss rate of packets of packet size L".

2. The communication system according to claim 1, wherein when the reception unit receives, via a relay device whose buffer overflows depending on a number of packets, the packets transmitted from the first communication device, the first communication device or the second communication device estimates, from the bit error rate during link transmission, a packet loss rate during link transmission for packets of an arbitrary packet size, and estimates a packet loss rate due to the buffer overflow of the relay device by subtracting the packet loss rate during link transmission from the packet loss rate calculated by the calculation unit for the packets of the arbitrary packet size.

3. The communication system according to claim 2, wherein the higher the packet loss rate due to the buffer overflow of the relay device is estimated to be, the longer the first communication device makes a transmission interval between the packets.

4. The communication system according to claim 3, wherein the packets of different packet sizes to be transmitted from the first communication device are configured by transmission data from the first communication device to the second communication device.

5. The communication system according to claim 1, wherein when the bit error rate during link transmission is above a predetermined value, a wireless link is determined to be present in a communication route between the first communication device and the second communication device.

6. A communication method comprising the steps of:
transmitting, by a first communication device, a plurality of packets in different packet sizes;
receiving, over one or more links by a second communication device, packets transmitted from the first communication device;
calculating a packet loss rate for each packet size based on reception result of the packets; and
estimating a bit error rate during link transmission of the packets from a difference of the packet sizes of the packets transmitted from the first communication device, as well as from the packet loss rate for each packet size, according to the relation:

$$BER=1-(P''_{loss}-1/P'_{loss}-1)^{1/L''-L'},$$

where $P'_{loss}$ is the loss rate of packets of packet size L', and $P''_{loss}$ is the loss rate of packets of packet size L".

7. A communication device comprising:
a reception unit for receiving over one or more links a plurality of packets transmitted in different packet sizes;
a calculation unit for calculating a packet loss rate for each packet size based on reception result of the reception unit; and
an estimation unit for estimating a bit error rate during link transmission of the packets from a difference of the packet sizes of the packets received by the reception unit, as well as from the packet loss rate for each packet size calculated by the calculation unit, according to the relation:

$$BER=1-(P''_{loss}-1/P'_{loss}-1)^{1/L''-L'},$$

where $P'_{loss}$ is the loss rate of packets of packet size L', and $P''_{loss}$ is the loss rate of packets of packet size L".

8. A processor encoded with a computer program for causing a computer to function as:
a reception unit for receiving over one or more links a plurality of packets transmitted in different packet sizes;
a calculation unit for calculating a packet loss rate for each packet size based on reception result of the reception unit; and
an estimation unit for estimating a bit error rate during link transmission of the packets from a difference of the packet sizes of the packets received by the reception unit, as well as from the packet loss rate for each packet size calculated by the calculation unit, according to the relation:

$$BER=1-(P''_{loss}-1/P'_{loss}-1)^{1/L''-L'},$$

where $P'_{loss}$ is the loss rate of packets of packet size L', and $P''_{loss}$ is the loss rate of packets of packet size L".

* * * * *